(12) United States Patent
Aftanas et al.

(10) Patent No.: US 9,643,542 B2
(45) Date of Patent: May 9, 2017

(54) VEHICLE ARTICLE CARRIER SYSTEM HAVING CROSS BAR END SUPPORTS WITH ANTI-LOOSENING MECHANISM

(71) Applicant: JAC Products, Inc., Saline, MI (US)

(72) Inventors: Jeffrey M. Aftanas, Ortonville, MI (US); Scott M. Barel, Lake Orion, MI (US); Conde M. Gonzalez, Utica, MI (US)

(73) Assignee: JAC Products, Inc., Saline, MI (US)

( * ) Notice: Subject to any disclaimer, the term of this patent is extended or adjusted under 35 U.S.C. 154(b) by 95 days.

(21) Appl. No.: 14/577,202

(22) Filed: Dec. 19, 2014

(65) Prior Publication Data

US 2015/0175082 A1 Jun. 25, 2015

Related U.S. Application Data

(60) Provisional application No. 61/919,418, filed on Dec. 20, 2013.

(51) Int. Cl.
*B60R 9/058* (2006.01)
*B60R 9/052* (2006.01)
*F16B 33/00* (2006.01)

(52) U.S. Cl.
CPC .............. *B60R 9/058* (2013.01); *B60R 9/052* (2013.01); *F16B 33/002* (2013.01)

(58) Field of Classification Search
CPC ....... B60R 9/052; B60R 9/058; F16B 33/002; F16B 39/32; F16B 39/26; F16B 39/24
See application file for complete search history.

(56) References Cited

U.S. PATENT DOCUMENTS

| | | | |
|---|---|---|---|
| 3,917,136 A * | 11/1975 | Carson | B60R 9/058 224/330 |
| 4,640,450 A | 2/1987 | Gallion et al. | |
| 4,812,094 A * | 3/1989 | Grube | F16B 39/10 301/111.01 |
| 5,104,020 A | 4/1992 | Arvidsson et al. | |
| 5,170,920 A | 12/1992 | Corrente et al. | |
| 5,618,143 A * | 4/1997 | Cronin, II | B25B 13/48 411/120 |
| 5,732,865 A | 3/1998 | Cucheran et al. | |
| 5,826,766 A | 10/1998 | Aftanas | |
| 5,931,359 A | 8/1999 | Zona | |
| 5,984,155 A | 11/1999 | Stapleton | |

(Continued)

*Primary Examiner* — Nathan J Newhouse
*Assistant Examiner* — Phillip Schmidt
(74) *Attorney, Agent, or Firm* — Harness, Dickey & Pierce, P.L.C.

(57) ABSTRACT

The present disclosure relates to a cross bar for a vehicle article carrier that may be releasably secured to a support rail. The cross bar has an end support at each end thereof for securing the cross bar to the support rail. Each end support has a main body configured to engage with a portion of the support rail, an opening in the main body, and a latching element moveably supported from the main body. A threaded member is used for controlling engagement of the latching member with the support rail. The threaded member has a head portion which engages with portions of a spring clip secured in the opening. This helps prevent loosening of the threaded member after it has been tightened.

16 Claims, 10 Drawing Sheets

(56) References Cited

U.S. PATENT DOCUMENTS

| | | | |
|---|---|---|---|
| 6,070,774 A * | 6/2000 | Rak | B60R 9/058 224/309 |
| 6,182,876 B1 | 2/2001 | Moliner | |
| 7,240,815 B2 | 7/2007 | Chimenti et al. | |
| 7,328,823 B2 | 2/2008 | Allen | |
| 7,985,042 B1 * | 7/2011 | Paxton | F16B 37/0842 411/437 |
| 8,104,651 B2 | 1/2012 | Bingham | |
| 8,276,794 B2 | 10/2012 | Aftanas | |
| 8,499,988 B2 | 8/2013 | Garland et al. | |
| 2006/0283900 A1 | 12/2006 | Stapleton | |
| 2006/0290154 A1 | 12/2006 | Stapleton | |
| 2009/0314815 A1 | 12/2009 | Stapleton | |
| 2010/0192704 A1 * | 8/2010 | Flaherty | B60R 9/058 73/862.21 |
| 2012/0031942 A1 * | 2/2012 | Lundgren | B60R 9/058 224/558 |
| 2014/0017027 A1 * | 1/2014 | Benzing | F16B 39/26 411/119 |

\* cited by examiner

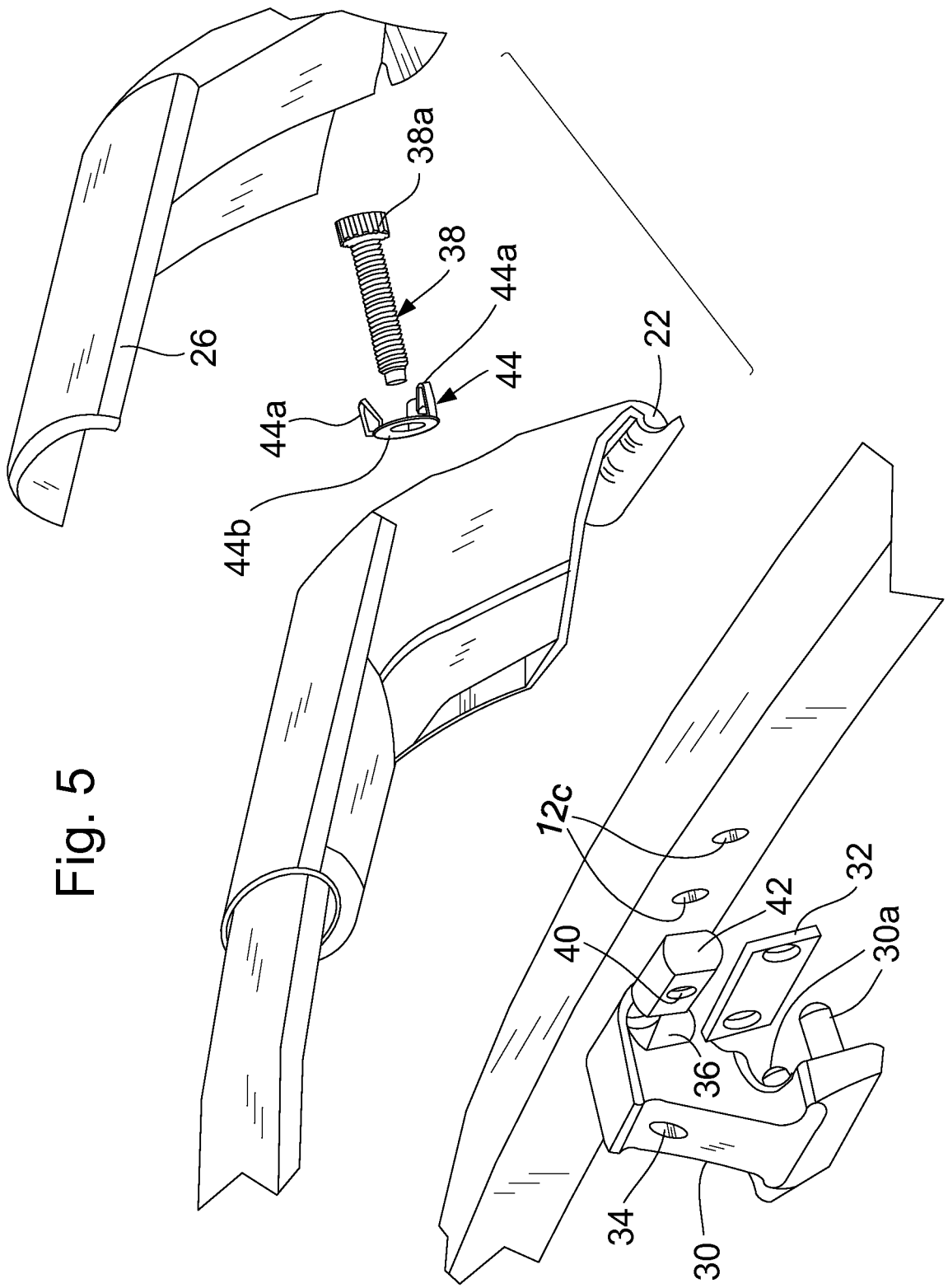

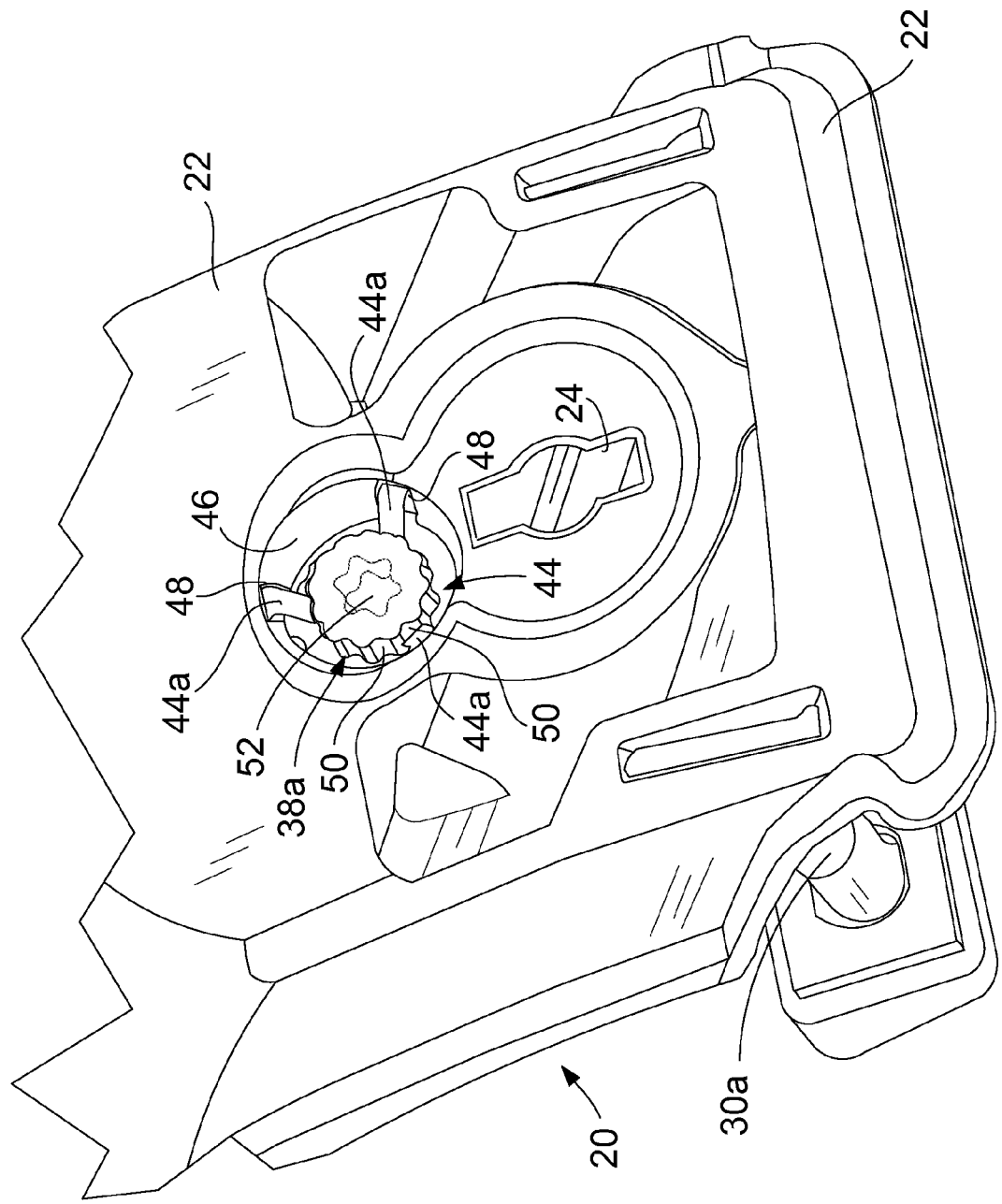

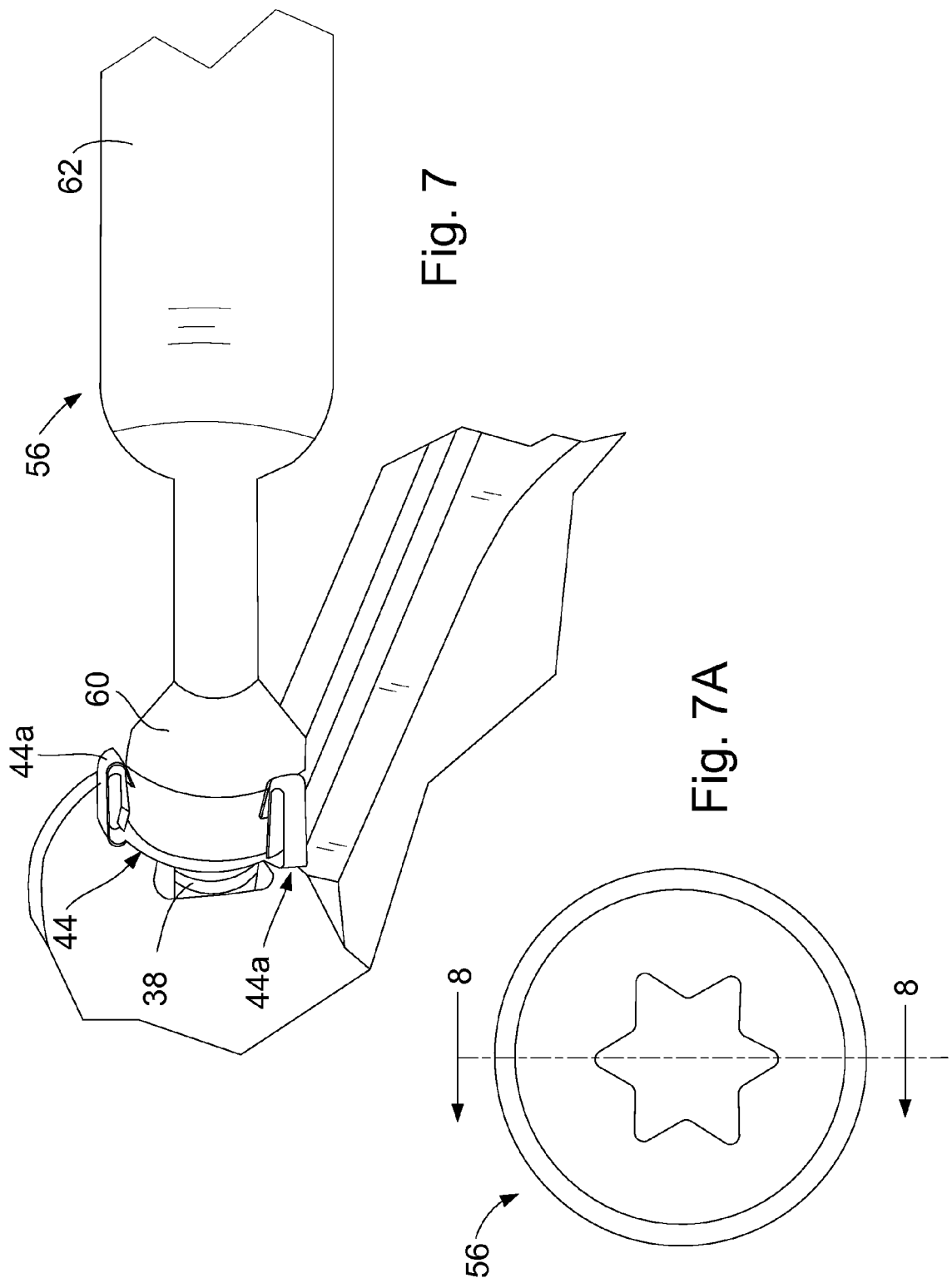

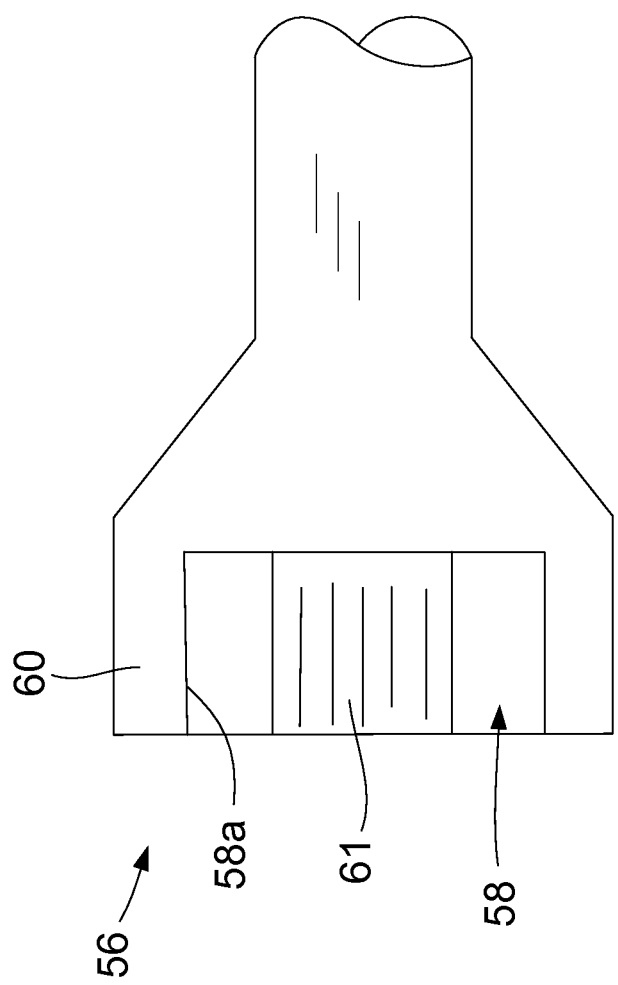

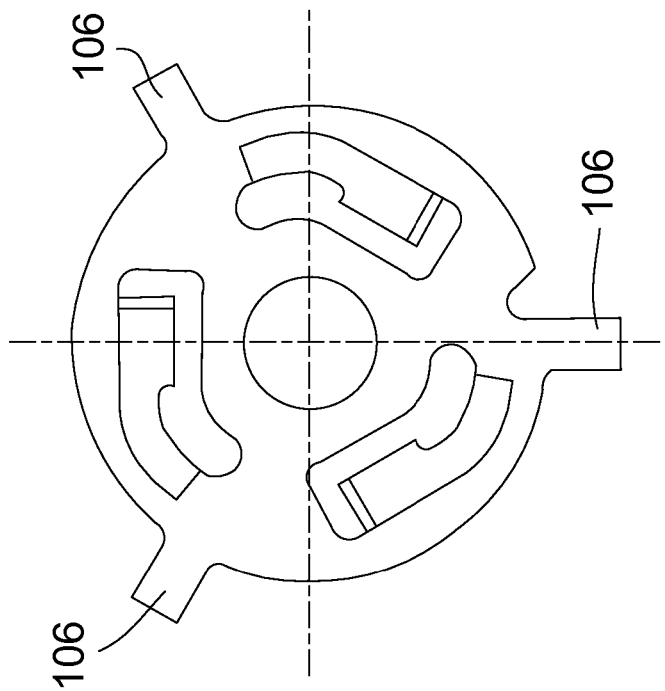
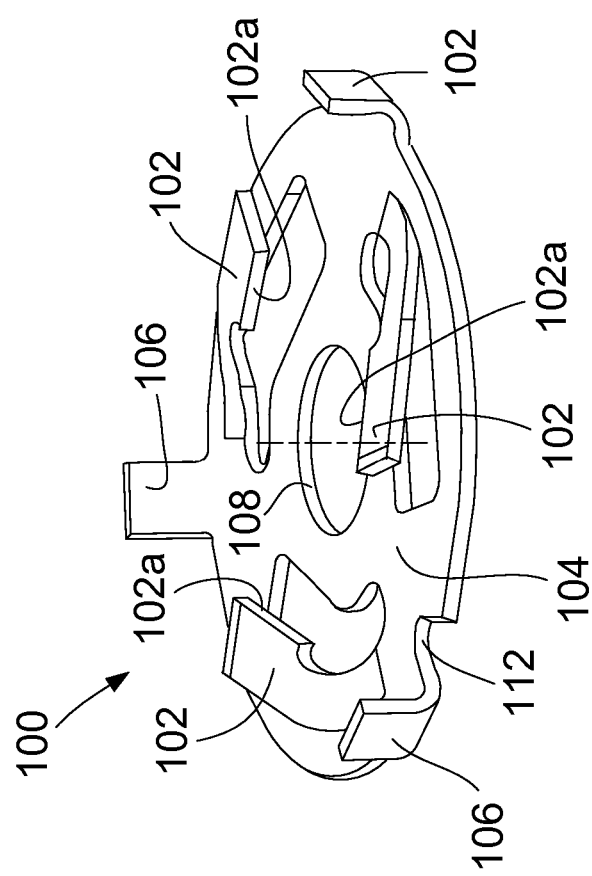

VEHICLE ARTICLE CARRIER SYSTEM HAVING CROSS BAR END SUPPORTS WITH ANTI-LOOSENING MECHANISM

CROSS REFERENCE TO RELATED APPLICATIONS

The present application claims priority from U.S. provisional patent application Ser. No. 61/919,418, filed Dec. 20, 2013, the entire disclosure of which is hereby incorporated by reference into the present application.

FIELD

The present disclosure relates to vehicle article carrier systems for supporting various articles thereon above a roof surface, and more particularly to a vehicle article carrier system having a cross bar with at least one end support which has an integral anti-loosening mechanism to ensure against loosening of the end support after it is has been manually tightened by a user.

BACKGROUND

The statements in this section merely provide background information related to the present disclosure and may not constitute prior art.

Vehicle article carriers are used in a wide variety of applications to secure and transport various articles above an outer body surface of a vehicle. In many implementations such vehicle article carriers involve the use of one or more cross bars that are secured to support rails. The cross bars typically make use of some form of tightening mechanism that enables an end support at each end of the cross bar to be secured, typically by clamping, to one of the support rails.

Many previously developed end supports rely on the torque imparted by a user in rotationally tightening some form of know or element to apply a sufficient clamping force to securely clamp the end support to its associated cross rail. However, individuals with limited hand strength may have difficulty in sufficiently tightening the mechanism to apply a suitable tightening force. In such events it would be helpful if the cross bar end support incorporated some form of integral structure that would ensure against the cross bar end support from loosening during use. In this manner, normal road vibration that the vehicle encounters while being driven would not be sufficient to cause loosening of the end support.

SUMMARY

In one aspect the present disclosure relates to a cross bar for a vehicle article carrier, wherein the cross bar is configured to be releasably secured to a support rail. The cross bar may comprise an end support at each end thereof for securing the cross bar to the support rail. Each end support may include a main body configured to engage with a portion of the support rail, an opening in the main body, and a latching element moveably supported from the main body. The latching element may be supported for movement between a latched position engaging the support rail, and an unlatched position wherein the end support is able to be lifted off of the support rail. A threaded member may be included which has a head portion with a plurality of first features formed on an outer perimeter of the head portion, and a center hole having a specialized configuration requiring a matching specialized tool to engage the center hole and rotate the threaded member. The main body may further include at least one second feature in the opening thereof and a spring clip inserted in the opening. The second feature engages with a portion of the spring clip to hold the spring clip stationary in the opening. The spring clip may further include a central opening for receiving a portion of the threaded member therethrough, and at least one third feature configured to engage the plurality of first features on the outer perimeter of the head portion. The engagement of the at least one third feature of the spring clip and the at least one second feature of the head portion of the threaded member cooperatively prevent loosening of the threaded member once the threaded member is rotated into a tightened orientation in which the latching element is latched to the support rail.

In another aspect the present disclosure relates to a cross bar for a vehicle article carrier, wherein the cross bar is configured to be releasably secured to a support rail. The cross bar may comprise an end support at each end thereof for securing the cross bar to the support rail. Each end support may include a main body configured to engage with a portion of the support rail, an opening in the main body, and a latching element. The latching element may be moveably supported from the main body for movement between a latched position engaging the support rail, and an unlatched position wherein the end support is able to be removed from the support rail. A threaded member may be included which has a head portion with a plurality of scallops formed on an outer perimeter of the head portion, and a center hole having a specialized configuration requiring a matching specialized tool to engage the center hole and rotate the threaded member. The threaded member may be operably coupled to the latching element. The main body may further include a plurality of first features formed therein, and a spring clip inserted in the opening and having a plurality of second features. The second features may engage the first features to hold the spring clip stationary within the opening. The second features of the spring clip further operate to engage the scallops in the head portion of the threaded member as the threaded member is tightened when securing the latching member to the support rail, thus preventing loosening rotation of the threaded member once the threaded member is tightened.

In still another aspect the present disclosure relates to a cross bar for a vehicle article carrier, wherein the cross bar is configured to be releasably secured to a support rail. The cross bar may comprise an end support at each end thereof for securing the cross bar to the support rail. Each end support may include a main body configured to engage with a portion of the support rail, an opening in the main body, and a latching element. The latching element may be moveably supported from the main body for movement between a latched position engaging the support rail, and an unlatched position wherein the end support is able to be lifted off of the support rail. A threaded member may be included which has a head portion with a plurality of first features formed on an outer perimeter of the head portion, and a center hole having a specialized configuration requiring a matching specialized tool to engage the center hole and rotate the threaded member. The main body may further include at least one second feature in the opening thereof, and a spring clip inserted in the opening. The second feature engages with a portion of the spring clip to hold the spring clip stationary in the opening. The spring clip may further include a central opening for receiving a portion of the threaded member therethrough, and at least one third feature configured to engage the plurality of first features on the outer perimeter of the head portion. The engagement of the at least one third feature of the spring clip and the at least one second feature of the head portion of the threaded member cooperatively prevent loosening of the threaded member once the threaded member is rotated into a tightened orientation in which the latching element is latched to the support rail.

BRIEF DESCRIPTION OF THE DRAWINGS

The drawings described herein are for illustration purposes only and are not intended to limit the scope of the present disclosure in any way.

FIG. 5 is an exploded perspective view similar to that shown in FIG. 3 but showing in greater detail the clamp of the end support and its associated components;

FIG. 6 is an enlarged perspective view of the end support showing in greater detail the spring clip V-shaped arm portions and how they engage within slots in an opening in the main body of the end support housing;

FIG. 7 is an enlarged view of a specialized tool that is being used to engage the head portion of the threaded bolt, with the remainder of the end support being shown in phantom;

FIG. 7a is an end view of the specialized tool looking into the end of the tool that is used to engage a fastener of the end support;

FIG. 8 is a side cross sectional view of the specialized tool of FIG. 7a, taken in accordance with section line 8-8 in FIG. 7a, illustrating the circumferential channel formed therein for engaging the head portion of the threaded bolt;

FIG. 9 is a perspective view of another embodiment of a spring clip in accordance with the present disclosure;

FIG. 10 is a plan view of the spring clip of FIG. 9; and

DETAILED DESCRIPTION

Figure 1:
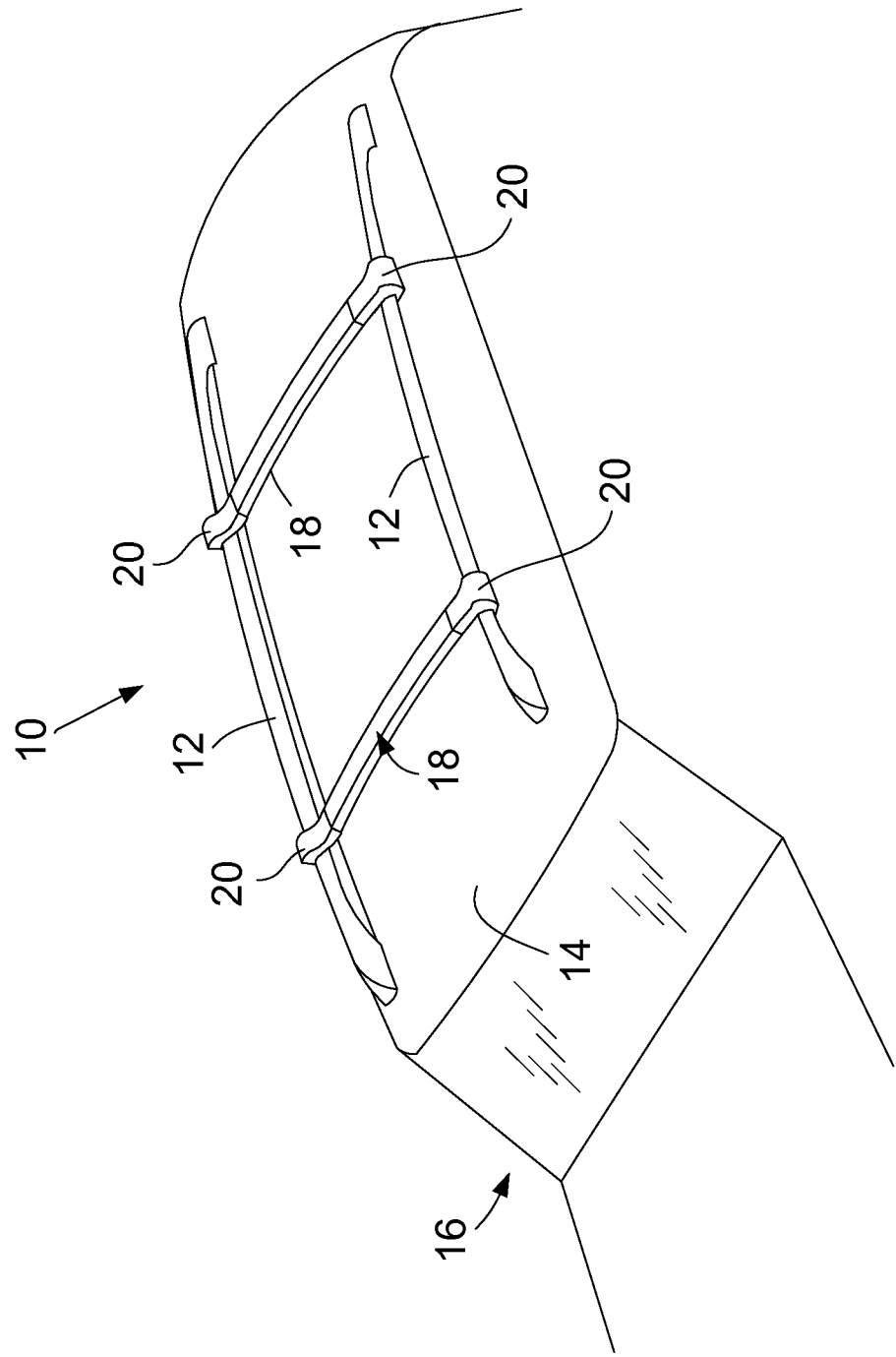
FIG. 1 is a perspective view of one embodiment of the vehicle article carrier of the present disclosure mounted on a roof of a motor vehicle.

The following description is merely exemplary in nature and is not intended to limit the present disclosure, application, or uses. It should be understood that throughout the drawings, corresponding reference numerals indicate like or corresponding parts and features.

Referring to FIG. 1 there is shown a vehicle article carrier system 10 in accordance with the present disclosure. The vehicle article carrier system 10 (hereinafter simply "system 10") may include a pair of support rails 12 that are fixedly secured to an outer body surface 14 of a vehicle 16. The system 10 may also include one or more cross bars 18. Each of the cross bars 18 has an end support 20 at each end thereof. In this example the end supports 20 are identical in construction but they need not necessarily be. Each end support 20 is used to clamp a respective end of its associated cross bar 18 to the support rails 12. Articles may be carried on the cross bars 18 using bungee cords or other suitable straps or securing implements. The cross bars 18 may also be adjustably positioned along the cross bars as needed, depending on the sizes and shapes of the articles being carried.

Figure 2:
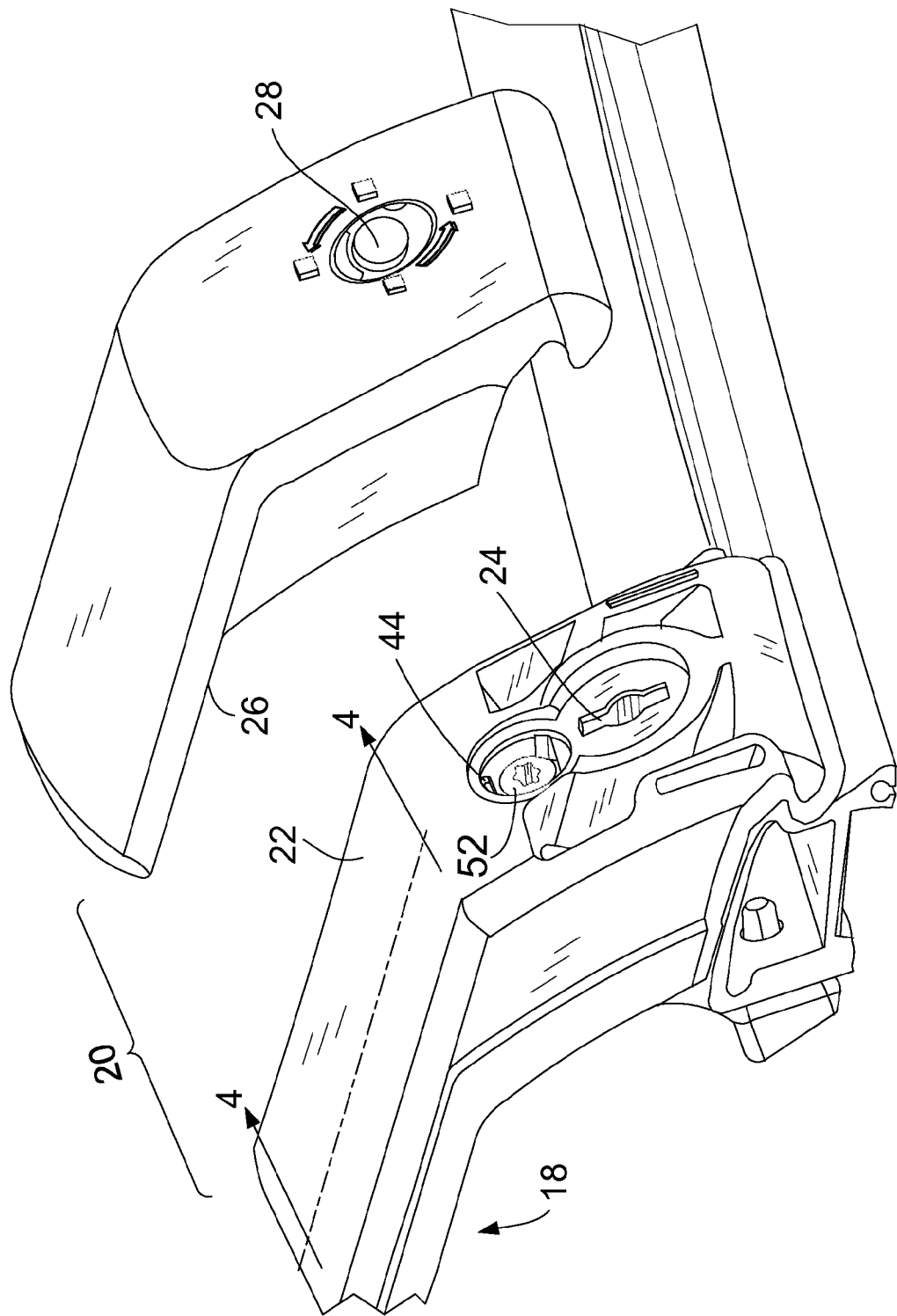
FIG. 2 is an exploded perspective view of one of the end supports shown in FIG. 1 with a cover of the end support separated from a main body of the end support, to reveal internal structure and an anti-loosening mechanism that is built into the end support.

FIG. 2 shows in greater detail one example construction for the end support 20. The end support 20 may include a main body 22 having a keyed opening 24. A cover 26 with a key element 28 that requires use of a specialized tool to attach it to the keyed opening 24 may be secured over the main body 22 once the end support 20 is secured to its respective support rail 12. In this manner the cross bar 18 will not be removable from its support rail 12, once assembled with the cover 26 thereon, without the use of the specialized tool.

Figure 3:
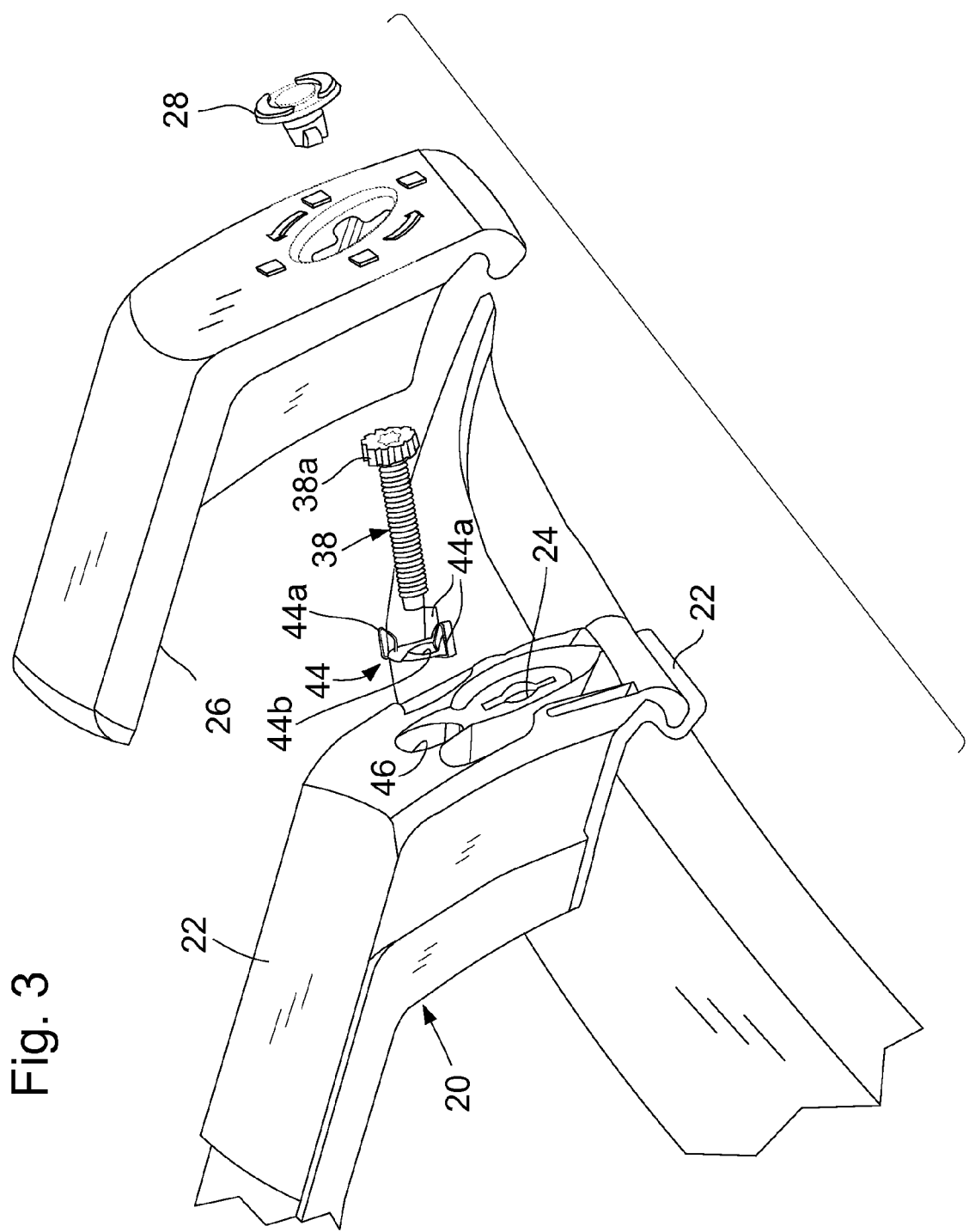
FIG. 3 is an exploded perspective view of the end support of FIG. 2 showing in greater detail the spring clip and threaded bolt used to implement the anti-loosening mechanism.
Figure 4:
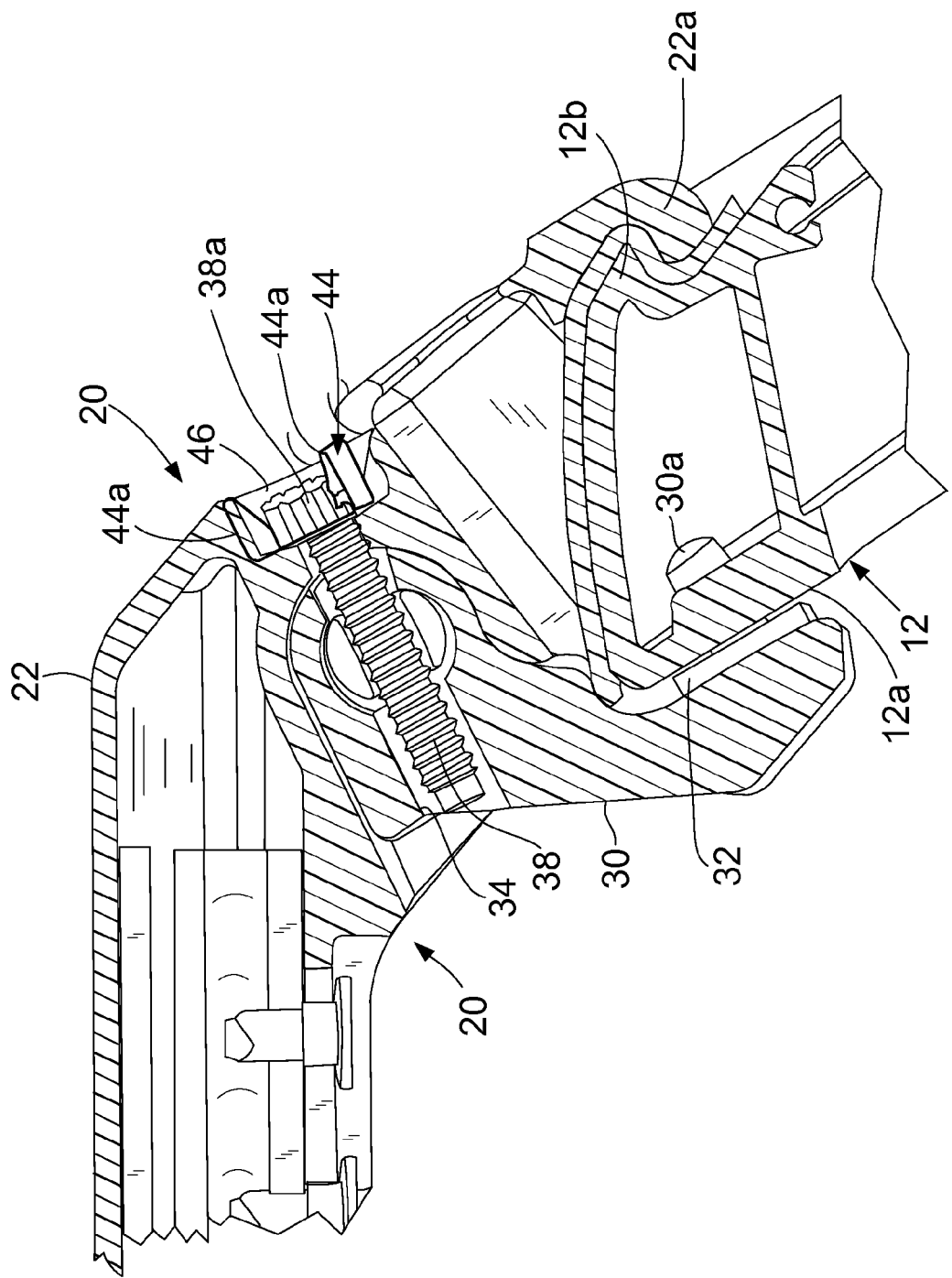
FIG. 4 is a side cross sectional view of the end support of FIG. 2 taken in accordance with section line 4-4 in FIG. 2.

Referring to FIGS. 3-5, the main body 22 also can be seen to include a latching element in the form of a clamp 30. The clamp 30 engages an inner surface 12a of the support rail 12 when the end support 20 is secured to the support rail. An outer lip 22a of the main body 22 engages a lip 12b on an outer surface of the support rail 12 when the end support 20 is secured to the support rail. The clamp 30 also preferably has one or more integral posts 30a that extend through corresponding holes 12c in the inner surface 12a of the support rail 12.

Referring further to FIGS. 3 and 5, the end support 20 can also be seen to include a resilient pad, for example a rubber pad 32, which may be positioned over the integral posts 30a. A bore 34 in the clamp 30 communicates with a transverse bore 36. The bore 34 receives a threaded bolt 38 which engages a threaded opening 40 in a barrel nut 42 that is positioned in the transverse bore 36. Tightening of the threaded bolt 38 causes the clamp 30 to be tightly clamped against the support rail 12.

With reference to FIGS. 3-5, an important feature of end support 20 is an anti-loosening mechanism in the form of a spring clip 44 which cooperates with a specially formed head portion 38a of the threaded bolt 38 to prevent loosening of the clamp 30 once it is tightened. As seen particularly well in FIG. 3, the spring clip 44 can be seen to include a plurality of generally V-shaped arm portions 44a and a center hole 44b. The spring clip 44 is preferably made of spring steel or any other suitable material that has a degree of resiliency to it, and which is resistant to corrosion from the elements.

Referring briefly to FIG. 6, the spring clip 44 is mounted in an opening 46 in the main body 22 of the end support 20. The opening 46 also has a plurality of three circumferentially arranged slots 48 which in this example are evenly spaced 120 degrees from one another around the opening 46 (only two being visible in FIG. 6). When the spring clip 44 is inserted into the opening 46 and the V-shaped arm portions 44a engage in the slots 48, the spring clip 44 will not be able to rotate within the opening 46.

With further reference to FIG. 6, the head portion 38a of the threaded bolt 38 can be seen to include features 50 formed around the entire perimeter of the head portion 38a. In the illustrated embodiment the features are scallops, and will be referred to throughout the following discussion as "scallops 50". A center blind hole 52 has a specialized configuration, in this example also scallops 52a, that requires a specialized (i.e., custom matching) tool for the threaded bolt 38 to be rotated once it is installed as shown in FIG. 6. Once installed, the head portion 38a engages the V-shaped arm portions 44a as the threaded bolt 38 is rotated.

Since the spring clip 44 is secured against rotation within the opening 46, once the threaded bolt 38 is tightened the V-shaped arm portions 44a will prevent rotation of the threaded bolt 38 in the opposite (i.e., loosening) direction. However, engaging the head portion 38a with a specialized tool that is keyed to engage the blind hole 52 allows a user to rotate the head portion in the opposite direction with sufficient force to overcome the holding force provided by the V-shaped arms portions 44a, thus enabling the threaded bolt 38 to be loosened. The resiliency of the V-shaped arm portions 44a thus enable the frictional holding force they provide to be overcome when a suitable tool is used to apply sufficient force to loosen the threaded bolt 38.

FIGS. 7, 7a, and 8 show a specialized tool 56 that may be used for engaging the head portion 38a of the threaded bolt 38. The tool 56 in this example includes a circumferential slot 58 (FIG. 8) in a head portion 60. The head portion 60 includes a center section 61 which is dimensioned and shaped to engage in the blind hole 52 of the head portion 38a, and particularly with the scalloped portions 50a, in a keyed fashion. As the tool 56 is inserted over the head portion 38a of the threaded bolt 38, the V-shaped arm portions 44a are forced radially outwardly out of the way of the tool head portion 60 as the center section 61 enters the blind hole 52. Once fully engaged with the blind hold 52, the tool 56 can be rotated by grasping a handle portion 62 (FIG. 7) to either tighten or loosen the threaded bolt 38. As soon as the tool 56 is removed from the head portion 38a of the threaded bolt, the V-shaped arm portions 44a flex back into engagement with the scallops.

While the spring clip 44 has been illustrated as having three V-shaped arm portions 44a, and the opening 46 in the end support main body 22 as having a corresponding number of slots 48, it will be appreciated that a greater or lesser number of V-shaped arm portions 44a and slots 48 may be employed. The principal object is that once engaged in the opening 46, the spring clip 44 is not able to rotate independently of the end support 20 main body. It will also be appreciated that spring clips having other shapes besides a generally circular shape may be employed, provided that the opening 46 has a suitable corresponding shape to engage the spring clip 44 and prevent rotation.

Figure 11:
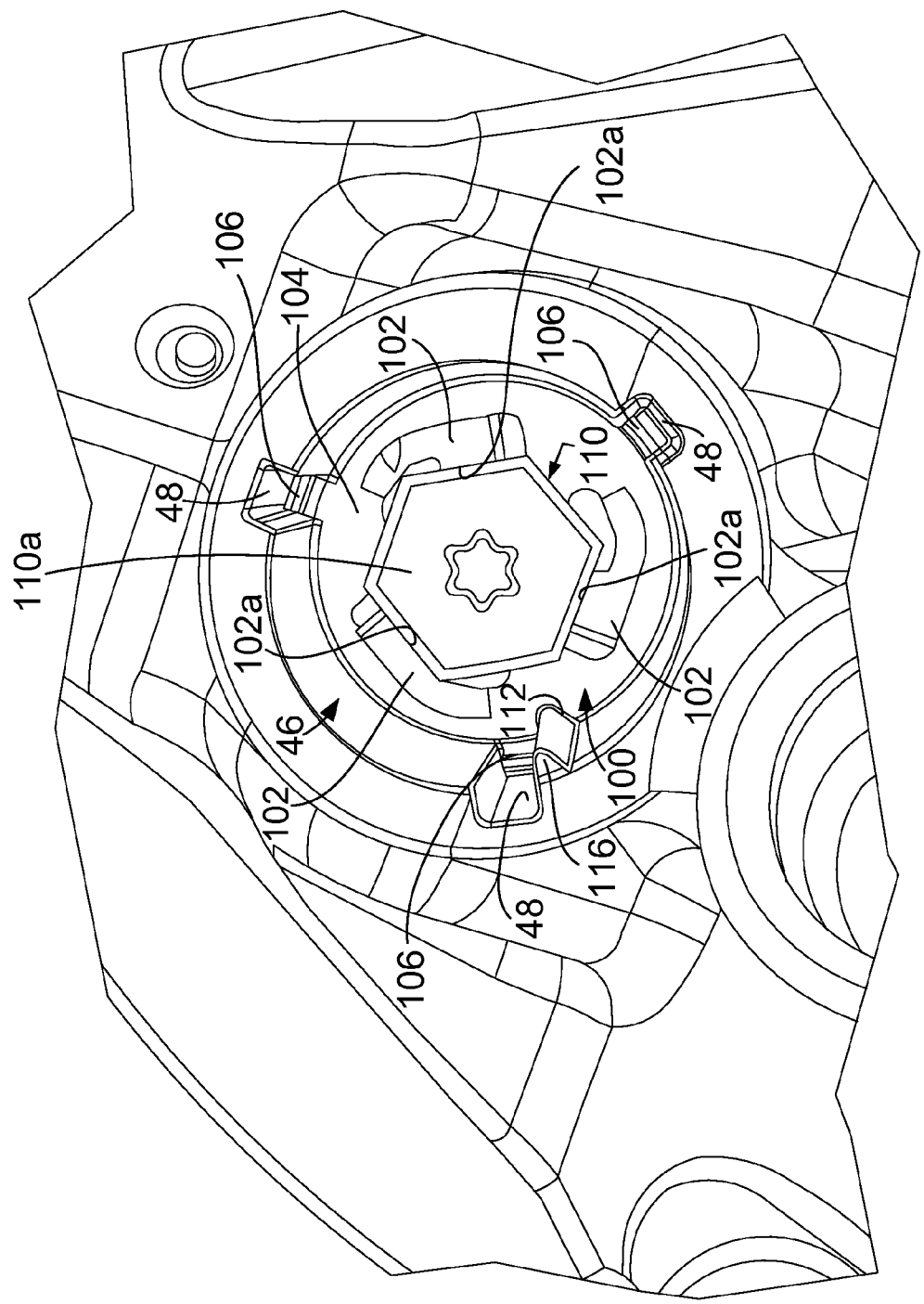
FIG. 11 is a perspective view of the arm portions of the spring clip of FIGS. 9 and 10 engaging the flat sides of a bolt head to prevent rotation of the bolt head.

Referring to FIGS. 9-11, a spring clip 100 in accordance with another embodiment of the present disclosure is illustrated. With specific reference to FIGS. 9 and 10, the spring clip 100 includes arm portions 102 that form cutouts in a base portion 104 of the spring clip. The arm portions 102 each include a flat surface 102a facing radially inwardly toward an axial center of the spring clip 100. A plurality of upstanding flanges 106 are also provided for enabling the spring clip 100 to be inserted in the opening 46 and engage with the slots 48, to thus prevent rotation of the spring clip. A center hole 108 allows the threaded bolt 38 to pass through the spring clip 100. The spring clip 100 is shown in FIG. 10 before the flanges 106 and the arm portions 102 have been bent into their final shape (as shown in FIG. 9).

With reference to FIGS. 9 and 11, the spring clip 100 differs from the spring clip 44 in that the spring clip 100 has the flat side 102a on the arm portions 102 that engage with the flat sides of a standard hex head 110a of a standard hex head threaded bolt 110 (FIG. 11). FIG. 11 shows the standard hex head 110a of the threaded hex head bolt 110 with the flats of the hex head 110a engaging the flat surfaces 102a of the arm portions 102. FIGS. 9 and 11 also show that the body portion 104 of the spring clip includes a notch 112 which engages with a rib 116 in the opening 46 of this embodiment. This ensures that the spring clip 100 cannot be inserted upside down into the opening 46 during assembly.

During installation and tightening of the threaded hex head bolt 110, the tool pushes down on the arm portions 102 to move them out of engagement with the flats of the threaded bolt 110, allowing the threaded bolt to be rotated either to tighten it or to loosen it. As soon as the tool is removed, the arm portions flex back into their raised positions, as shown in FIG. 11, to engage the flats of the threaded bolt 110. The flat surfaces 102a provide a relatively longitudinally long area of contact which helps to ensure that no rotation of the threaded hex head bolt 110 can occur once the tool is removed. Moreover, if one, or even two, of the arm portions 102 were to break, even a single one of the arm portions 102 would be helpful in preventing loosening of the threaded bolt hex head bolt 110.

It is a principal advantage of the system 10 that the spring clip 44 or spring clip 100 and the threaded bolt 38 form integral components of the end support 20. As such, there is no need for the user to separately install the spring clip 44 or spring clip 100 before using the end support 20. The threaded bolt 38 also functions to both tighten the clamp 30 on to the support rail 12 as well as to interact with the spring clip 44 or 100 to prevent loosening thereof once it is tightened. Thus, no separate bolt-like component is required to achieve the anti-loosening feature of the present disclosure.

The system 10, and particularly the spring clip 44 or 100 and the threaded bolt 38, can be implemented in a wide variety of vehicle article carrier end support configurations with only little modification being required to the end support. Essentially any form of vehicle article carrier end support that employs a hand-tightened, or hand tool tightened, element may potentially be a candidate for the teachings of the present disclosure. The system 10 and method disclosed herein also is readily able to be implemented in other types of article carrier components, such as with an adjustably positionable tie down component. Such a tie down component often includes a rotatable wheel by which the user clamps the tie down component at a desired position along a fixedly mounted track (such in a roof mounted support rail or a pickup truck bed mounted rail) with a channel in it. The teachings of the present disclosure could be implemented with such a user engageable, rotatable wheel to further ensure that when the tie down element is tightened at a desired point along its track, that it will not thereafter be able to loosen by itself because of vibration or other extraneous forces.

It will therefore be appreciated that the teachings of the present application could be employed with virtually any type of mechanism employing a threaded tightening element, where it is important that once the threaded tightening element is tightened that it cannot thereafter come loose on its own. The teachings of the present disclosure provide a system and method which provides a degree of added insurance that even if a marginal tightening force is applied to the threaded bolt by a person of limited hand strength, or via a hand tool, that the end support will not thereafter loosen from vibration experienced while the vehicle is being operated.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. For a vehicle article carrier, an article carrier component adapted to be tightened to an article carrier element, the article carrier component comprising:
 a main body configured to engage with a portion of the article carrier element;
 an opening in the main body;
 a latching element moveably supported from the main body for movement between a latched position engaging the article carrier element, and an unlatched position wherein the article carrier component is able to be removed from the article carrier element;
 a threaded member having a head portion with a plurality of first features formed on an outer perimeter of the head portion, and a center hole having a specialized configuration requiring a matching specialized tool to engage the center hole and rotate the threaded member;
 the main body further including at least one second feature in the opening thereof;
 a spring clip inserted in the opening and including a plurality of third features, wherein the second feature engages with one of the third features of the spring clip to hold the spring clip stationary in the opening, the spring clip further including a central opening for receiving a portion of the threaded member therethrough, and the plurality of third features configured to engage the plurality of first features on the outer perimeter of the head portion;
 wherein the engagement of the plurality of third features of the spring clip and the plurality of first features of the head portion of the threaded member engage to cooperatively prevent loosening of the threaded member once the threaded member is rotated into a tightened orientation in which the latching element is secured to the article carrier element; and
 wherein the plurality of third features comprises a plurality of arm portions, and wherein the second feature comprises a slot, and wherein a portion of one of the plurality of arm portions engages within the slot to prevent rotation of the spring clip when the threaded member is rotated in either a loosening direction or a tightening direction.

2. The article carrier component of claim 1 wherein the article carrier component comprises an end support of a cross bar of the vehicle article carrier, and wherein the end support secures an end of the cross bar to the article carrier element.

3. The article carrier component of claim 1, wherein the at least one second feature comprises a plurality of circumferentially spaced apart slots formed in the opening.

4. The article carrier component of claim 1, wherein the plurality of third features of the spring clip comprise flexible arm portions.

5. The article carrier component of claim 4, wherein each of the arm flexible portions comprises a V-shaped arm portion.

6. The article carrier component of claim 1, wherein the plurality of first features on the perimeter of the head portion of the threaded member include a plurality of scallops.

7. The article carrier component of claim 1, wherein:
 the at least one second feature comprises a plurality of slots spaced about 120 degrees apart from one another around the opening in the main body; and
 wherein ones of the plurality of arm portions are spaced about 120 degrees apart around the opening in the spring clip, and which engage with the first features on the head portion of the threaded fastener; and
 wherein the second feature comprises a plurality of slots, and wherein each one of the arm portions engages within one of the plurality of slots to hold the spring clip stationary in the main body.

8. The article carrier component of claim 1, wherein the threaded member threadably engages with a portion of the latching element, and such that the head portion of the threaded member retains the spring clip in the opening in the main body of the end support.

9. The article carrier component of claim 1, wherein the latching element comprises a pivotally supported clamping element configured to clamp onto a portion of the article carrier element when moved into the latched position.

10. The article carrier component of claim 1, further comprising a removable cover for covering the opening and the threaded member.

11. A cross bar for a vehicle article carrier, wherein the cross bar is configured to be releasably secured to a support rail, the cross bar comprising:
 an end support at each end thereof for securing the cross bar to the support rail, each said end support including:
 a main body configured to engage with a portion of the support rail;
 an opening in the main body;
 a latching element moveably supported from the main body for movement between a latched position engaging the support rail, and an unlatched position wherein the end support is able to be removed from the support rail;
 a threaded member having a head portion with a plurality of scallops formed on an outer perimeter of the head portion, and a center hole having a specialized configuration requiring a matching specialized tool to engage the center hole and rotate the threaded member, the threaded member being operably coupled to the latching element;
 the main body further including a plurality of first features formed therein;
 a spring clip inserted in the opening and having a plurality of second features which engage the first features to hold the spring clip stationary within the opening;
 the second features of the spring clip further operating to engage the scallops in the head portion of the threaded member as the threaded member is tightened to engage the latching member with the support rail, thus preventing loosening rotation of the threaded member once the threaded member is tightened;
 the plurality of second features forming a plurality of arm portions configured to engage with the first features; and
 the plurality of arm portions each forming V-shaped arm portions that each engage with ones of the plurality of scallops.

12. The cross bar of claim 11, wherein the plurality of first features comprise a plurality of slots spaced apart about a circumference of the opening in the main body.

13. The cross bar of claim 11, wherein the latching element comprises a clamping element pivotally supported within the end support.

14. A cross bar for a vehicle article carrier, wherein the cross bar is configured to be releasably secured to a support rail, the cross bar comprising:

an end support at each end thereof for securing the cross bar to the support rail, each said end support including:

a main body configured to engage with a portion of the support rail;

an opening in the main body;

a latching element moveably supported from the main body for movement between a latched position engaging the support rail, and an unlatched position wherein the end support is able to be removed from the support rail;

a threaded member having a head portion with a plurality of scallops formed on an outer perimeter of the head portion, and a center hole having a specialized configuration requiring a matching specialized tool to engage the center hole and rotate the threaded member, the threaded member being operably coupled to the latching element to move the latching element between the latched position and the unlatched position;

the main body further including a plurality of spaced apart slots formed circumferentially about the opening;

a spring clip inserted in the opening and having a plurality of V-shaped arm portions which engage the slots to hold the spring clip stationary within the opening, the spring clip further having a center opening to enable the threaded member to pass through the spring clip; and the V-shaped arm portions of the spring clip further operating to engage the scallops in the head portion of the threaded member as the threaded member is tightened, to thus urge the latching member into engagement with the support rail, the spring clip and the scallops thus preventing loosening rotation of the threaded member once the threaded member is tightened.

15. The cross bar of claim 14, wherein the V-shaped arm portions comprise three V-shaped arm portions spaced about 120 degrees apart from one another.

16. The cross bar of claim 14, wherein the plurality of spaced apart slots comprises three slots spaced apart 120 degrees around a circumference of the opening.

* * * * *